WIRE PRINTER WITH OSCILLATORY PRINT HEAD

Filed July 1, 1957 6 Sheets-Sheet 1

INVENTOR.
BY WARD LEATHERS
Eli Weiss
ATTORNEY

Nov. 3, 1959 W. LEATHERS 2,911,085

WIRE PRINTER WITH OSCILLATORY PRINT HEAD

Filed July 1, 1957 6 Sheets-Sheet 2

INVENTOR.
WARD LEATHERS
BY
Eli Weiss
ATTORNEY

WIRE PRINTER WITH OSCILLATORY PRINT HEAD

INVENTOR.
WARD LEATHERS
BY
Eli Weiss
ATTORNEY

WIRE PRINTER WITH OSCILLATORY PRINT HEAD

Filed July 1, 1957 6 Sheets-Sheet 4

INVENTOR.
WARD LEATHERS
BY
Eli Weiss
ATTORNEY

Nov. 3, 1959 W. LEATHERS 2,911,085

WIRE PRINTER WITH OSCILLATORY PRINT HEAD

Filed July 1, 1957 6 Sheets-Sheet 5

INVENTOR.
WARD LEATHERS
BY
Eli Weiss
ATTORNEY

Nov. 3, 1959 W. LEATHERS 2,911,085

WIRE PRINTER WITH OSCILLATORY PRINT HEAD

Filed July 1, 1957 6 Sheets-Sheet 6

INVENTOR.
WARD LEATHERS
BY
Eli Weiss
ATTORNEY

United States Patent Office 2,911,085 Patented Nov. 3, 1959

2,911,085

WIRE PRINTER WITH OSCILLATORY PRINT HEAD

Ward Leathers, Massepequa Park, N.Y., assignor to Burroughs Corporation, Detroit, Mich., a corporation of Michigan Application July 1, 1957, Serial No. 669,020

22 Claims. (Cl. 197—1)

This invention relates generally to a printing device and more particularly to an improved high speed single character printer.

Presently, serially printing devices register the position of each character prior to printing by one of two methods. In one group of devices the printing mechanism is positioned accurately relative to a fixed point and the paper is moved from right to left, in steps, to obtain a line of printed characters. The typewriter is a well-known example of this type of structure. In the other group, the paper is held in a fixed position and the printing mechanism is moved across the sheet of paper, in steps, from left to right.

In each instance however, immediately after a character has been printed a relatively large mass must be stepped rapidly to the next letter position. The time required to position or drive the movable member to the next character position increases as the mass of the movable member increases.

With reference to the first system, that of moving the paper and its supporting platen relative to a stationary print element, it is difficult and expensive to attain relatively high speed printing on a record bearing medium as the large mass of the moving platen presents undesirable inertial effects which inhibit rapid positioning of the record bearing medium from one print position to the next. The time required to position the paper for each character can be appreciable relative to the time required to actually print each character, and therefore can result in a relatively slow printing device. Because of inertial effects, a heavy platen also requires an appreciable time to be returned to its initial position for the start of a new line of characters.

In the second system a print element is oriented relative to a fixed sheet of paper. This system is faster than the first system, however the mass of the print element also presents detrimental inertial effects which restrict the speed that the head can be stepped across a sheet of paper and therefore, limits the number of characters that can be printed each minute.

In the systems presently utilized the actual printing of a character on a sheet of paper can be done rapidly. However the time required to advance the moving member (the platen or the print element) to the next print position is relatively slow and therefore contributes materially to the time required to complete each print cycle.

It is a primary object of this invention to provide an improved single character printer that can operate at a high rate of speed.

It is an additional object of this invention to provide an improved single character wire mosaic printer that is relatively free of detrimental inertial effects.

It is another object of this invention to provide an improved single character wire mosaic printer that can make a number of copies simultaneously.

It is still another object of this invention to provide an improved single character wire mosaic printer that is reliable in operation and economical to produce.

Other objects and many of the attendant advantages of this invention will be readily appreciated as the apparatus becomes better understood by reference to the following detailed description when considered in connection with the accompanying drawings wherein.

Briefly, a number of printing units in the form of wires are grouped together to form a mosaic print head and are selectively operable in various combinations to form different characters. The selective operation of the wire printing elements of the print head is under the control of electromagnetic devices which are selectively operated to determine or identify the combination of wires required to be moved from non-print to print position in order to form any particular character. Impulses generated by information sensed from a punch card, a magnetic tape, a computor, or the equivalent can represent the character that is to be printed. Cyclically operating means is provided for effecting the movements of the printing elements to print position in accordance wtih their selection and for restoring said elements to non-print position.

A wire matrix print head is supported adjacent to a record bearing medium and pivotally coupled to a support member. For each line of printed characters the support member is driven continuously across the sheet of paper while the print head is oscillated back and forth in the direction of support member travel. Thus, while the support member moves continuously across the sheet of paper, the print head steps across the sheet of paper. The print head oscillates through one complete cycle for each unit (character) displacement of the support member and the velocity of the oscillating print head equals substantially the velocity of the support member. Therefore, for a portion of each cycle the print head stops moving relative to the paper to facilitate the printing of a character. This cycle is continued until a line of characters has been printed on the paper.

The only moving part that is subjected to detrimental inertial effects during the serial printing of a line of characters is the light weight low inertial print head. In this manner, the detrimental effects attributable to the inertia of the system are reduced to an absolute minimum to provide a high speed printer.

Figures 1, 3, 4:
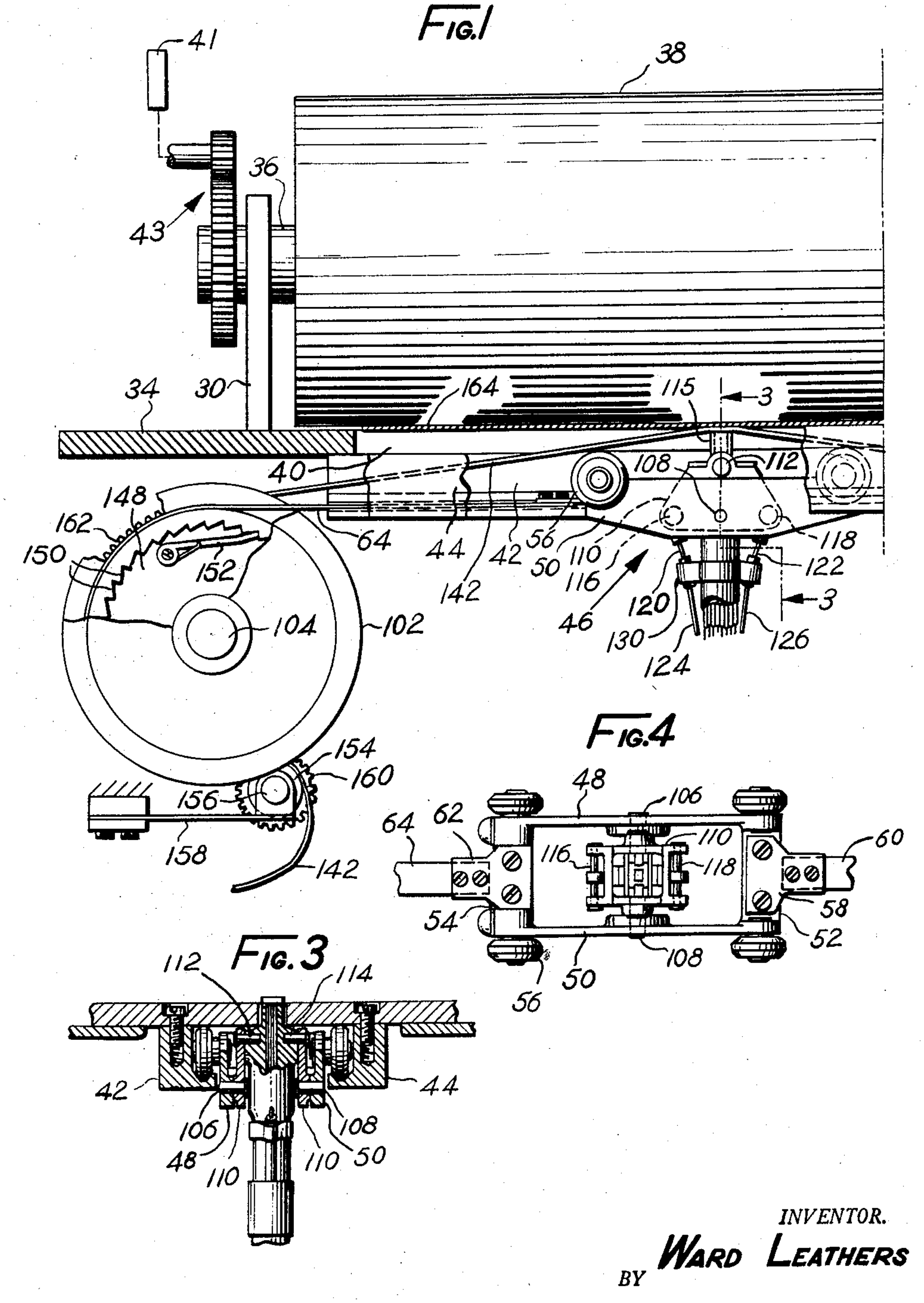
Fig. 1 shows a portion of a platen, a side view of the print head carriage assemblage, and a carriage rewind assemblage.
Fig. 3 is a view along the line 3—3 of Fig. 1 showing a cross section of the print head carriage assemblage.
Fig. 4 is a top view of the print head carriage assemblage.
Figures 2, 5:
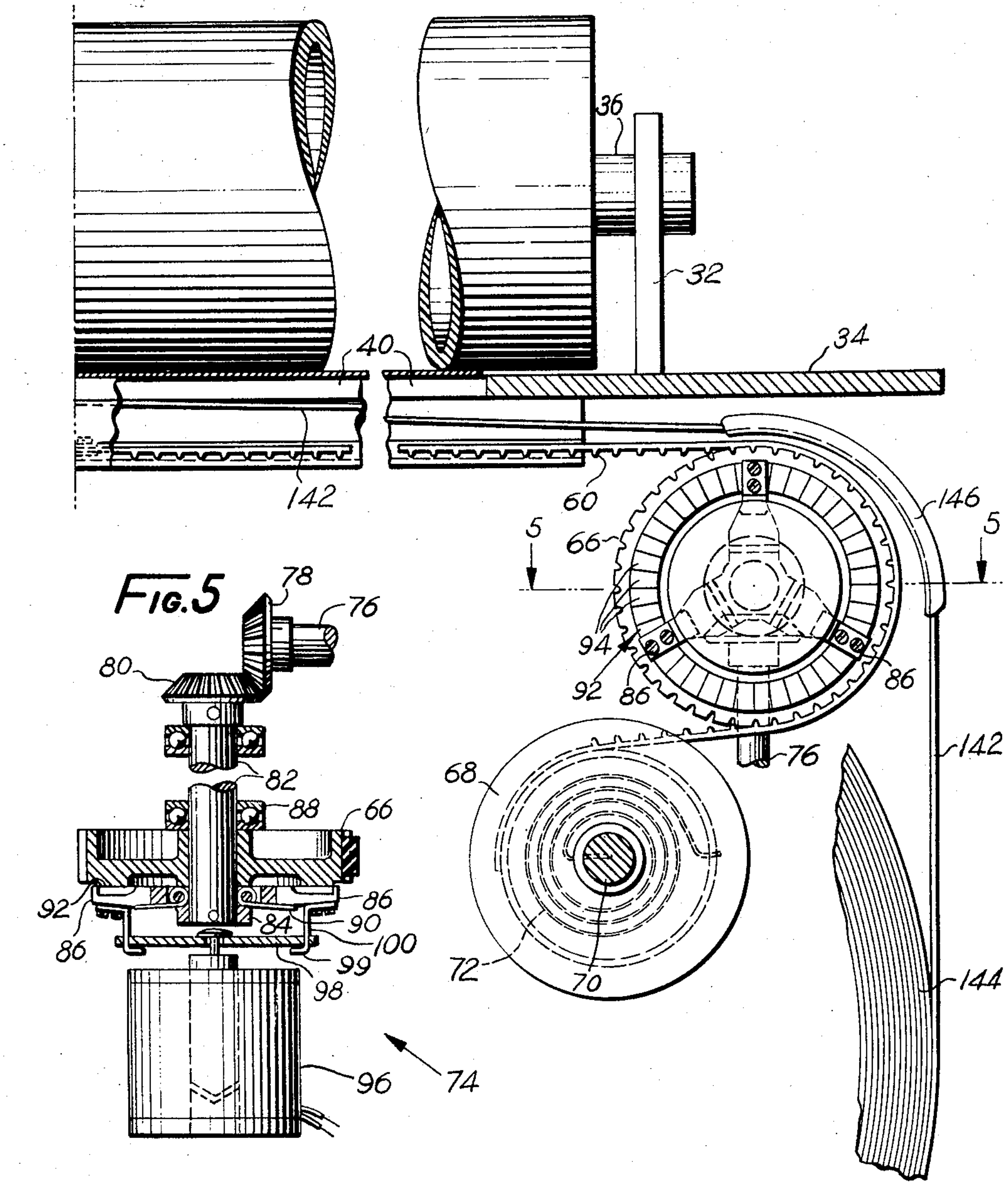
Fig. 2 shows the other portion of the platen of Fig. 1 and a carriage advance assemblage.
Fig. 5 is a view along the line 5—5 of Fig. 2 showing the print head carriage drive clutch assemblage.

Referring to Figs. 1 and 2, there is illustrated a side view of an improved high speed single character printer in accordance with the principles of this invention. A record bearing medium such as a sheet of paper, a card or the equivalent is supported in a fixed lateral position by a rotatable platen. For each line of characters a support member is driven continuously across the sheet of paper from left to right. A wire matrix print head, pivotally coupled to said support member is driven back and forth from left to right to left, in the direction of carriage movement, once for each character position. The support member moves across the sheet of paper at a uniform rate of speed while the print head is stepped across the sheet of paper. The speed of the end of the wire matrix print head positioned adjacent to the record bearing medium is equal substantially to the speed of the constantly moving support member. As the wire matrix print head oscillates from right to left the movement of the wire matrix print head neutralizes the movement of the constantly moving support member to provide a wire matrix print head that is stationary relative to the record bearing medium for a portion of its oscillatory cycle. In this manner the detrimental inertial effects of the assemblage is reduced to an absolute minimum to facilitate the high speed positioning of the wire matrix print head.

Two upright support members 30 and 32 are coupled securely to a base plate 34 by means of screws or the equivalent. Each support member rotatably receives a shaft 36 that is rigidly coupled to a resilient cylindrical member or platen 38.

A record bearing medium that is to receive the printed characters is positioned partially around the platen 38 adjacent to the face plate. A slot 40 in the base plate exposes an area of the record bearing medium which extends from one side to the other. The printed characters are positioned within this area. The platen 38 can be made of yieldable material such as rubber or the equivalent similar to the material used for the paper support roller in typewriters. A solenoid acting through an appropriate linkage, or the drive shaft of a motor 41 is connected to the shaft 36 of the fixed position rotatable platen 38 through a set of gears 43 to advance the paper in steps from top to bottom past the slot 40 for each line of print. The paper cannot be displaced from side to side, it can only be advanced from top to bottom.

Two L-shaped tracks or rails 42 and 44 positioned to face each other are coupled securely to the undersurface of the base plate 34 on each side of the slot 40 by means of screws or the equivalent. A rigid boxed shaped member having two sides 48 and 50 and two ends 52 and 54 form the support or stable member of a print head carriage assemblage 46. Small externally protruding pins are connected securely by solder or the equivalent to the ends of each side. A small wheel 56 is rotatably coupled to each pin. The four wheels of the carriage assemblage 48 are supported by and roll on the horizontal arms of the L-shaped rails. The carriage is retained captive on the rails by means of small projections located at the ends of each rail.

One end of a flexible rack gear or gilmer drive belt 60 is connected to the end 52 of the stable member of the carriage assemblage by means of a coupling bracket 58. The flexible rack gear advances the carriage continuously along the tracks from left to right at a uniform rate of speed during the printing operation. A return belt 64 is connected to the end 54 of the stable member by means of a coupling bracket 62. The return belt drives the stable member rapidly to the left hand end of the tracks for the start of a new line of print.

The flexible rack drive belt 60 is driven toward the right by a drive pulley 66 and the excess or slack portion of the belt is stored on a take-up spool 68. The take-up spool rotates around a center bearing shaft 70. One end of a spiral spring 72 is anchored to the shaft 70, and the other end is anchored to the spool 68. The spring 72 is preloaded to urge the spool 68 to rotate in a counterclockwise direction. The drive pulley 66 is selectively coupled through a clutch assemblage 74 to a shaft 76 rotated at a constant speed. The belt 60 cannot be stored on the drive pulley as this would alter the outside diameter of the pulley and destroy the effects of the constant speed drive.

Therefore a take-up spool is provided to store the slack or excessive portion of the belt. The force exerted by the spiral spring does not contribute to the advance of the carriage, it merely takes up the slack portion of the forward drive belt.

The clutch assemblage 74, Fig. 5, selectively couples the constantly rotating shaft 76 through a shaft 82 to the drive pulley 66. The shaft 76 is pinned to a bevel gear 78 which engages a second bevel gear 80 that is pinned to one end of the shaft 82. The two bevel gears 78 and 80 cooperate to mechanically transmit the power delivered by the shaft 76 through a ninety degree angle. The other end of the shaft 82 is attached by pins or set screws to a collar 84 which pivotally supports three arms 86 spaced apart on one hundred and twenty degree centers. The drive pulley 66 is rotatably coupled to the shaft 82, its lateral movement being restricted by the collar 84 and a bearing 88. The arms 86 are urged by springs 90 into contact with the side 92 of the pulley 66. The side area 92 of the pulley 66 is shaped to present a plurality of positive engaging stops such as saw tooth shaped projections 94 to the arms 86. Thus, as the shaft 76 is rotated at a constant speed, its motion is transmitted through the bevel gears 78 and 80, the shaft 82, and the arms 86 which engage the saw tooth projections 94 to rotate the pulley 66 at a constant speed.

For each line of printed characters the stable member is first returned rapidly to the left end of the tracks, and then driven towards the right along the tracks at a constant determinable speed. The printing operation is performed as the carriage travels towards the right. To facilitate the rapid return of the carriage to the left end of the tracks a solenoid 96 is provided to disengage the driving pulley 66 from the arms 86 to allow the driving pulley to rotate freely about the drive shaft 82. The plunger of the solenoid is coupled to a disc 98 which engages small projections 99 on the brackets 100 that are secured to the ends of the arms 86 by screws, solder or the equivalent. When the solenoid 96 is not energized, the plunger assumes an extended position to position the disc 98 free of the projections 99, and the springs 90 urge the arms 86 into contact with the saw tooth projections 94 to lock the pulley 66 to the shaft 82. To disengage the pulley 66 from the shaft 82, the solenoid 96 is energized. As the plunger moves into the coil, the disc 98 engages the projections 99 to move the arms 86 out of engagement with the saw tooth projections 94 to allow the drive pulley to rotate freely relative to the shaft 82.

The return belt 64 drives the stable member to the left end of the tracks against the action of the take-up spool 68 when the pulley 66 is disengaged from the shaft 82. The other end of the return belt 64 is pinned to the periphery of a return pulley 102 rotatably coupled to a stationary shaft 104. One end of a spiral spring is attached securely to the stationary shaft 104, and at the other end is attached securely to the pulley 102. This spiral spring is preloaded to exert a continuing force on the stable member through the pulley 102 and the belt 64 for all displacements of the stable member; the force exerted being the greatest when the carriage is in the extreme right position. Thus, as the stable member is driven towards the right, the return belt unwinds from the pulley 102 to further tension the spiral spring to provide the power that drives the stable member to the left against the force of the spiral spring 72 when the drive gear 66 is disengaged from the shaft 82 by the activation of the solenoid 96.

Securely attached to the sides 48 and 50 of the carriage 46 are two aligned internally projecting pins 106 and 108. An inverted U-shaped coupling member 110 is positioned between the sides 48 and 50 of the stable member and pivotally connected at its lower ends to the pins 106 and 108. Securely attached to the two arms of the inverted U-shaped coupling member 110 are two aligned internally projecting pins 112 and 114. The top of the member 110 is slotted to accommodate a wire matrix print head 115 which is pivotally connected to the projecting pins 112 and 114. Two pins 116 and 118, displaced laterally on each side of the aligned pins 106 and 108, extend internally from one leg of the inverted U-shaped member 110 to the other. One end of each of two rocking wires 120 and 122 is pivotally connected to the pins 116 and 118 respectively. The wires 120 and 122 are movable within their respective flexible guide tubes 124 and 126 which, in turn, are secured rigidly to the group of flexible guide tubes around the print wires by a clamp 130.

Figures 6, 7, 8:
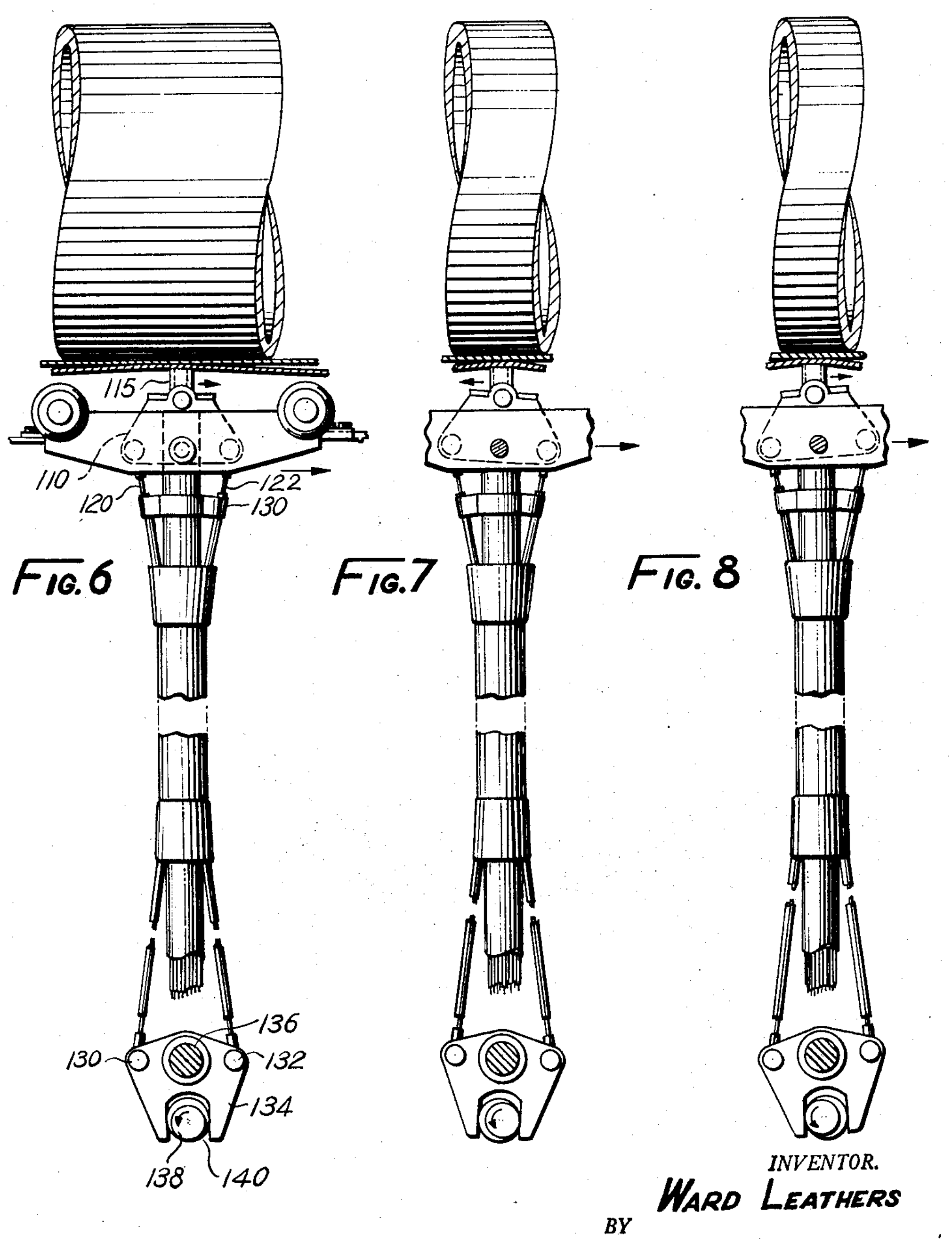
Figs. 6–8 illustrate three different positions of the wire matrix print head in compliance with the principles of this invention.

The other ends of the rocking wires 120 and 122 are pivotally coupled by means of pins 131 and 132 respectively to a rocker plate 134 pivotally connected to oscillate about a stationary shaft 136 (Fig. 6).

A rotating cam 138 positioned within a U-shaped cut out 140 in the rocker plate 134 oscillates the U-shaped member 110 through the rocker plate 134 and the rocking wires 120 and 122. The wire matrix print head 115 projects through the slot in the top of the member 110 and through the slot 40 to be substantially flush with the top surface of the base plate 34.

The wire matrix print head is composed of a number of flexible wires selectively advanced in groups to form different characters. The construction and operation of the control, driving, and return structure for a wire matrix print head that can be utilized in this invention is described fully in Patent 2,681,614, issued June 22, 1954, to Frederick Q. Rast and, therefore, this structure will not be further described herein. The top of the wire matrix print head is positioned adjacent to but does not contact the record bearing medium. When a character is to be printed, however, a particular group of wires are advanced beyond the print head to contact the record bearing medium. The prime mover utilized with the drive to advance and return the print wires in the wire matrix print head can also be utilized with the drive to advance the stable member at a constant speed.

To facilitate the transfer of the configuration formed by the activated wires to a record bearing medium, a pressure sensitive medium or transference device such as an inked ribbon is positioned between the print head and the record bearing medium.

An inked ribbon 142 from a spool 144 is fed around a guide 146, through the slot 40 in the base plate 34, over the top of the print head 115, back down through the slot 40, and around a ribbon drive spool 148. The ribbon drive spool 148 is positioned adjacent to the return pulley 102 and rotatably coupled to the stationary shaft 104. The return pulley 102 contains a row of saw tooth projections 150 which engage a spring loaded arm or pawl 152 attached to the ribbon drive spool 148.

The projections 150, through the pawl 152, drive the ribbon drive spool 148 and therefore the inked ribbon in a counterclockwise direction when the return pulley 102 rotates in a counterclockwise direction; however, the rotation of the return pulley 102 in a clockwise direction does not result in an angular displacement of the ribbon drive spool 148.

An idler roller 154 is frictionally coupled to the spool 148 and pivotally coupled to a shaft 156 which is supported by an arm 158. The arm 158 is composed of a spring material to urge the roller 154 into contact with the ink ribbon drive spool 148. The inked ribbon is positioned around the ribbon drive spool 148 and between the spool 148 and the roller 154. To insure positive movement of the inked ribbon, a ring gear 162 on the periphery of the ribbon drive spool 148 is coupled to a gear 160 which is coupled to the roller 154 by pins or the equivalent.

In operation, a record bearing medium 164 is positioned between the roller 38 and the base plate 34 to expose a portion of the medium to the wire matrix print head 115 through the slot 40. The stable member is initially positioned at the extreme left position on the tracks. During the print cycle the stable member is driven at a constant speed along the tracks towards the right while the print head is oscillated back and forth from left to right to left one complete cycle for each character position.

If it is desired to print ten characters per inch, then for each linear inch of displacement of the stable member towards the right, the print head will complete ten cycles. The oscillations of the print head are synchronized through a cam 138 to eliminate all motion between the print head and the record bearing medium during the print portion of each cycle. The stable member is driven across the record bearing medium from left to right at a constant speed while the print head is oscillated back and forth at the speed of travel of the stable member. When the print head moves forward the print head moves, relative to the paper, at approximately twice the speed of the stable member, however, when the print head moves backwards it neutralizes the forward movement of the stable member to eliminate all movement of the print head relative to the record bearing medium. It is during this backward movement of the print head that the printing operation of a character is performed.

The oscillatory movement of the print head is illustrated in detail in Figs. 6, 7 and 8. Referring to the support assemblage for the print head, the inverted U-shaped coupling member 110 is rocked back and forth about the axis through the pins 106 and 108 while the print head 115 oscillates back and forth about the axis through the pins 112 and 114. The flexible cables that form the print head are secured to a rigid member at a point many inches below the print head. Depending upon space limitations this distance may vary from approximately six inches to two feet or more. As the coupling member 110 is rocked back and forth, its center of rotation is about the axis through the pins 106 and 108; however, the center of rotation of the print head is not about the axis through the pins 112 and 114, but about an axis located many inches below the axis defined by the pins 112 and 114. Thus, the radius of rotation of the print head 115 is very large compared to the radius of rotation of the coupling member. This double pivot action and the large radius of rotation of the print head enables the top surface of the print head to remain parallel to the paper at all times to provide a clear uniform impression of each print wire for each character printed.

Figs. 6, 7 and 8 show the action of the print head 115 and the inverted U-shaped coupling member 110 for the neutral and two extreme positions of the cam 138.

The cam 138 is synchronized to make one complete revolution for each print cycle and is angularly oriented to rock the U-shaped coupling member 110 backward from the direction of travel of the stable member to eliminate all motion between the print head and the record bearing medium during each print operation. As the cam 138 is rotated from the extreme top position (Fig. 6) counterclockwise ninety degrees (Fig. 7) the member 110 is rocked to advance the print head in the direction of travel of the carriage to the next character position. An additional one hundred and eighty degrees of rotation of the cam 138 (Fig. 8) rocks the member 110 backwards from the direction of travel of the stable member to stop all motion of the print head relative to the record bearing medium.

The pivot action of the print head 115 about the pins 112 and 114 positions the top of the print head parallel to the record bearing medium 164. It is during the backwards rocking of the member 110 that the print operation is performed. Further rotation of the cam 138 through an additional ninety degrees rocks the member 110 forward to the position shown in Fig. 6, and the cycle of oscillating the member back and forth is continued for each character until a line of characters has been printed on the sheet of paper. It is to be noted that during the printing of a line of characters the carriage is moved continuously across the record bearing medium while the print head is stepped across the record bearing medium.

Through the action of the spring loaded arm 152 and the saw tooth projections 150, the inked ribbon remains stationary while the carriage is advanced from left to right along the tracks. In this manner a new portion of the inked ribbon is exposed to the print head and the record bearing medium for each character position.

When the carriage reaches the extreme right end of the track, the solenoid 96 is energized and the pulley 66 is disengaged from the shaft 82, and the return pulley 102, through the action of the spiral spring and the return belt 64, drives the stable member rapidly to the left end of the track against the action of the take-up spool 68 on the flexible rack gear. The rotation of the return pulley 102 drives the inked ribbon drive spool 148, through the saw tooth projections 150 and the spring loaded arm to position a new line-length of ribbon beneath the record bearing medium. As the stable member is returned to the left end of the tracks for the printing of a new line of characters, a signal is fed to the motor or solenoid 41 to advance the record bearing medium one line position by rotating the platen 38. Stop positions on the tracks maintain the stable member captive.

After the stable member has been returned to the left end of the tracks, the solenoid 96 is de-energized and the arms 86 are urged into contact with the saw tooth projections 94 by means of the springs 90.

Since the shaft 76, and therefore the shaft 82 rotates continuously, provisions must be made to selectively lock the pulley 66 to the shaft 82 to tabulate the letters of each line. This is accomplished by the positive engaging stops or saw tooth projections 94 on pulley 66, and the arms 86. When the solenoid is de-energized, the continuously rotating arms 86 are urged into contact with the projections 94, however, the pulley 66 does not begin to rotate until the arms contact the sharp projections of the saw tooth projections. In this manner the letters of each line are tabulated.

As the pulley 66 is rotated at a constant speed, the stable member is advanced continuously along the tracks from left to right, the print head is oscillated back and forth, and the printing operation is performed. As the stable member is advanced, the return belt 64 is unwound from the return pulley 102 and the slack portion of the flexible rack gear is stored on the take-up spool 68. The print operation can be stopped at any particular instant by merely energizing the solenoid 96 of the clutch assemblage 74. This procedure allows the stable member to return to the left end of the tracks and, as long as the solenoid 96 is energized, the stable member will remain at the left end of the tracks. Thus, a signal that indicates "stop printing" is fed to the solenoid 96 and to the control structure of the wire matrix print head simultaneously to prevent the advance of any of the print wires and the displacement of the print head.

Depending upon the type of input signals utilized, it may be necessary to utilize a converter to change the input signals to an appropriate form for utilization by the control of the wire matrix print head.

In operation, the speed of the printing operation is synchronized to the speed of receipt of input signals unless an appropriate memory device is utilized; and then the speed of printing can be less than the speed of receipt of input signals.

Figures 9, 10:
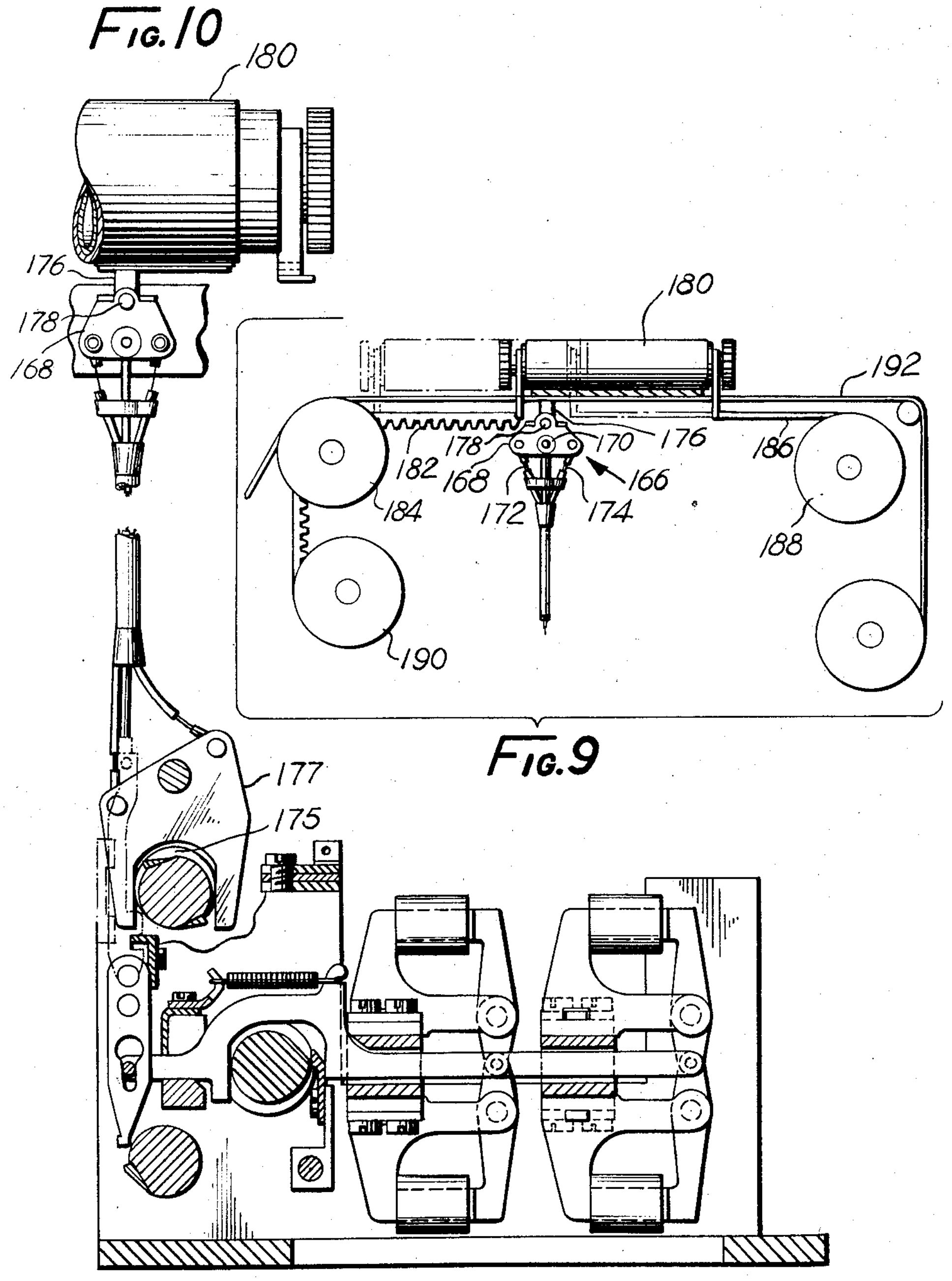
Fig. 9 illustrates another embodiment in accordance with the principles of this invention.
Fig. 10 illustrates, in greater detail the control mechanism for activating the printing wires and oscillating the group of printing wires for the embodiment shown in Fig. 9.
Figure 11:
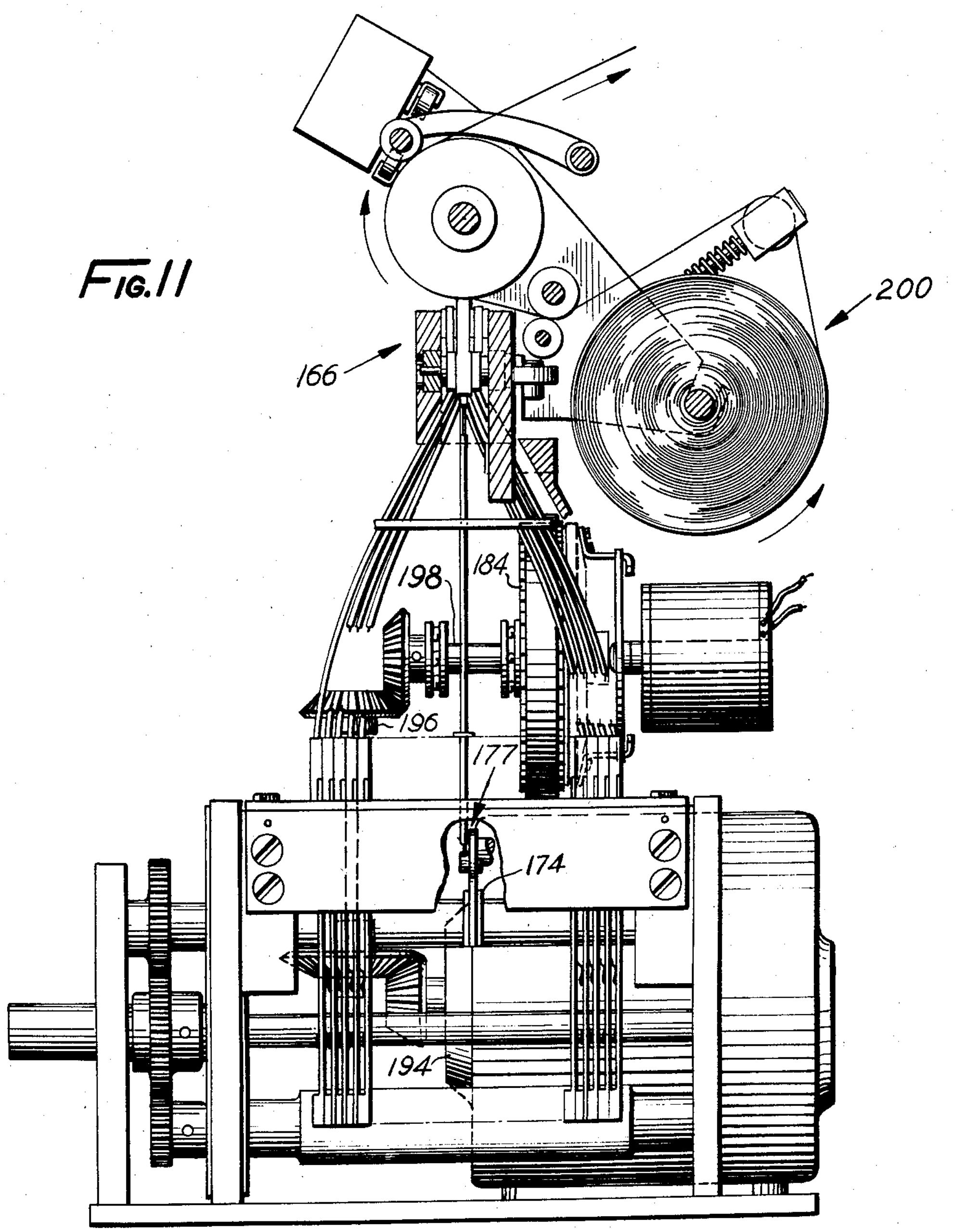
Fig. 11 is a side view of the embodiment shown in Fig. 9.

Referring to Figs. 9, 10 and 11 there is illustrated an embodiment of this invention where the platen and the record bearing medium is moved continuously from right to left relative to a fixed position oscillating wire matrix print head during the printing of a line of characters.

A print head assemblage 166 consists of a member 168 rocked about a fixed shaft 170, by flexible cables 172 and 174 pivotally attached to the member 168 on either side of the shaft 170. The cables 172 and 174 are activated by a cam 175 through a rocker plate assemblage 177. A wire matrix print head 176 is pivotally coupled to the member 168 by a shaft 178. The print head assemblage 166 is similar in design and construction to the print head assemblage illustrated in Figs. 1, 6, 7 and 8 except that in this embodiment the assemblage is pivoted about a shaft that is secured to a fixed member, not to a movable member.

A platen 180 which supports a record bearing medium is slidably coupled to a set of tracks for continuous movement past the wire matrix print head 176 from right to left during the printing operation while the print head assemblage 166 is oscillated back and forth. The printing operation is performed when there is no relative motion between the record bearing medium and the print head, and occurs when the print head 176 is driven from right to left.

The platen 180 is driven, during the printing of a line of characters, from right to left at a constant speed by a flexible rack gear 182 coupled to a drive pulley 184. The drive pulley 184 is coupled to a constant speed drive through a clutch. As the stable member moves towards the left, a return belt 186 is unwound from a return pulley 188 and the excess portion of the belt 182 from the drive pulley is stored on a spool 190. The construction and operation of the stable member forward and return drive, and the record bearing medium advance drive to step the paper for the printing of a new line of print is similar to the forward, return and paper advance drives for the print head carriage assemblage 46 and member 38 (Figs. 1 and 2). In this embodiment, however, the inked ribbon 192 must be moved continuously past the print head to present a new area for each character to be printed. An inked ribbon drive pulley coupled to the drive pulley 184 through a spring loaded arm or pawl, and saw tooth projections similar to the projections 150 and arm 152 of Fig. 1 will advance the inked ribbon to present a new area of ribbon to the print head for each character position and, when the carriage is returned for the start of a new line the ribbon will remain stationary.

Fig. 10 illustrates in greater detail the structure and activating elements for operating the print wires in the print head and for oscillating the print head assemblage.

Fig. 11 is a side view of the embodiment illustrated in Figs. 9 and 10. The shaft of a constant speed motor 194 is connected through a set of bevel gears to a shaft 196. A second set of bevel gears connects the shaft 196 to a shaft 198 which is connected to the drive pulley 184 through a clutch assemblage similar to that illustrated in Fig. 5.

The above mentioned embodiments can be utilized to print carbon copies and information on a continuous sheet of paper 200 or on flat forms stored behind the carriage.

Figure 12:
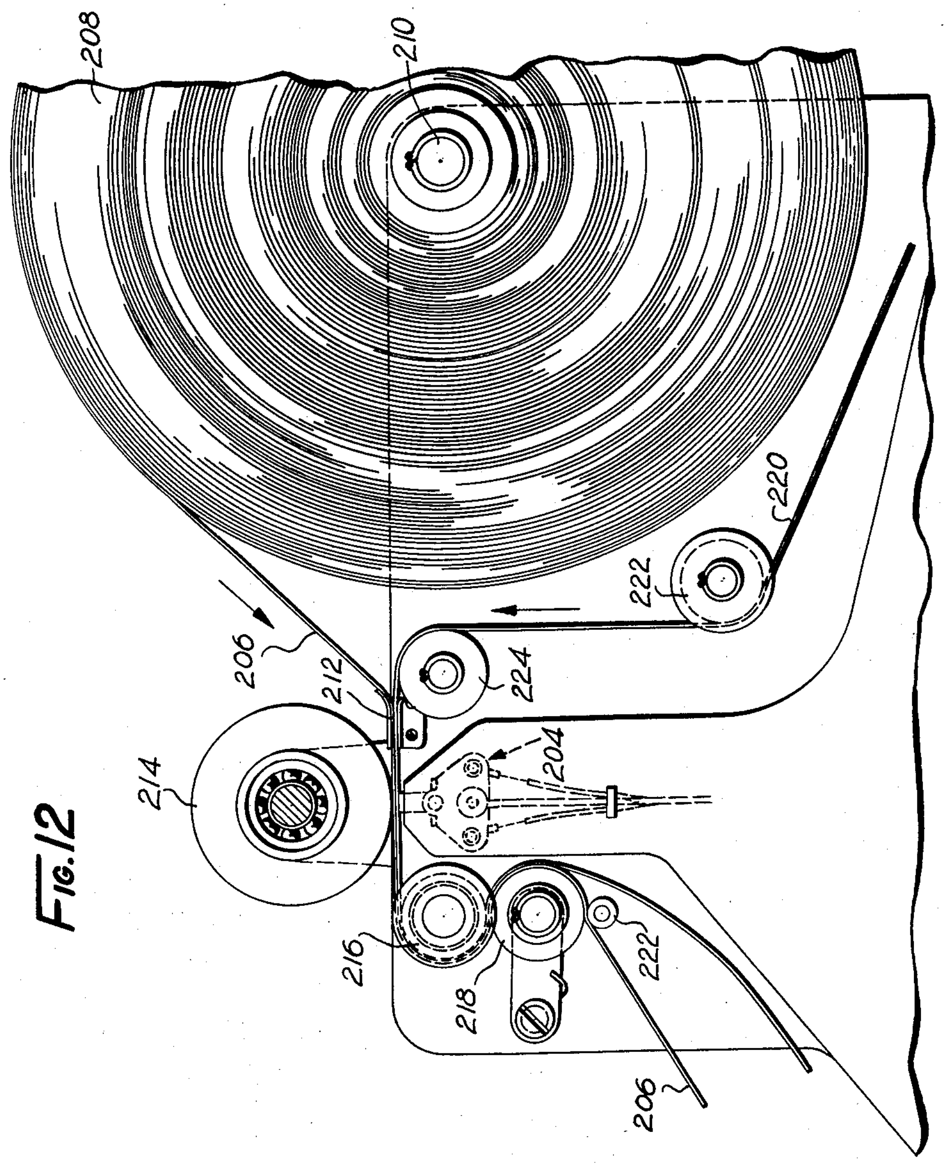
Fig. 12 illustrates still another embodiment in accordance with the principles of this invention.

The embodiment illustrated in Fig. 12 can print characters on a continuous strip of record bearing medium such as a paper tape. A roll of paper tape 208 is rotatably coupled to a support shaft 210. Tape 206 from the roll is driven at a constant speed past a print head assemblage 204 which is similar to the print head assemblage 166 of Figs. 9, 10 and 11 which oscillates about a fixed pivot. The paper tape 206 from the roll is threaded through a guide 212 to pass between the oscillating wire matrix print head and a free rolling platen 214, and then around and between two contacting rollers 216 and 218. The roller 216 is driven at a constant rate of speed, and the roller 218 insures frictional contact between the paper tape and the roller 216. The roller 218 is rotatably coupled to one end of an arm which is pivotally coupled to a rigid member, urged continuously by a spring to drive the roller 218 into contact with the roller 216.

An inked ribbon 220, also stored in roll form, is fed around two idler guide rollers 222 and 224 and then through the guide 212 to pass between the print head and the paper tape; and then around and between the two rollers 216 and 218. An idler roller 222 separates the tape from the used inked ribbon.

The tape and the inked ribbon are moved continuously at the same rate of speed by means of the drive rollers. The print head assemblage is oscillated back and forth in the direction of paper tape travel and performs the print operation for each character during that portion of its oscillatory cycle when there is no relative motion between the print head and the inked ribbon and tape.

Obviously many modifications and variations of the present invention are possible in the light of the above teachings. It is therefore to be understood that within the scope of the appended claims the invention may be practiced otherwise than as specifically described.

What is claimed is:

1. A device for printing characters in a desired serial order comprising a support member, a record bearing medium, a print element coupled to said support member, a linear drive coupled to advance said support member along a substantially straight path across said record bearing medium, and an oscillating drive coupled to drive said print element back and forth in the direction of travel of said support member to periodically retard displacement of said print element relative to said record bearing medium.

2. A device for printing characters in a desired serial order comprising a support member, a record bearing medium, a wire matrix print head coupled to said support member, a linear drive coupled to advance said support member along a substantially straight path across said record bearing medium, and an oscillating drive coupled to drive said wire matrix print head back and forth in the direction of travel of said support member to periodically retard displacement of said wire matrix print head relative to said record bearing medium.

3. A device for printing characters in a desired serial order comprising a support member, a record bearing medium, a coupling member swingably coupled to said support member, a print element swingably coupled to said coupling member, a linear drive coupled to advance said support member along a substantially straight path across said record bearing medium, and an oscillating drive coupled to drive said print element back and forth in the direction of travel of said support member to periodically retard displacement of said print element relative to said record bearing medium.

4. A device for printing characters in a desired serial order comprising a support member, a record bearing medium, a coupling member swingably coupled to said support member, a wire matrix print head swingably coupled to said coupling member, a linear drive coupled to advance said support member along a substantially straight path across said record bearing medium, and an oscillating drive coupled to drive said wire matrix print head back and forth in the direction of travel of said support member to periodically retard displacement of said wire matrix print head relative to said record bearing medium.

5. A device for printing characters in a desired serial order comprising a support member, a record bearing medium, a coupling member swingably coupled to said support member, a print element swingably coupled to said coupling member, a linear drive coupled to advance said support member along a substantially straight path across said record bearing medium, an oscillating drive coupled to drive said print element back and forth in the direction of travel of said support member to periodically retard displacement of said print element relative to said record bearing medium, and activating means coupled to selectively activate said print element to print a character on said record bearing medium when the print element moves backward relative to the motion of the support member.

6. A device for printing characters in a desired serial order comprising a support member, a record bearing medium, a coupling member swingably coupled to said support member, a print element swingably coupled to said coupling member, pressure sensitive marking medium interposed between said print element and said record bearing medium to facilitate the printing of a character, a linear drive coupled to advance continuously said support member along a substantially straight path across said record bearing medium, an oscillating drive coupled to drive said print element back and forth in the direction of travel of said support member to periodically retard displacement of said print element relative to said record bearing medium, and activating means coupled to selectively activate said print element to print a character on said record bearing medium when the print element moves backward relative to the motion of the support member.

7. A device for printing characters in a desired serial order comprising a support member, a record bearing medium, a coupling member swingably coupled to said suport member, a print element swingably coupled to said coupling member, an inked ribbon interposed between said print element and said record bearing medium to facilitate the printing of a character, a linear drive coupled to advance said support member along a substantially straight path across said record bearing medium, an oscillating drive coupled to drive said print element back and forth in the direction of travel of said support member to periodically retard displacement of said print element relative to said record bearing medium, and activating elements synchronized with said oscillating drive to selectively activate said print element to print a character on said record bearing medium when the print element moves backward relative to the motion of the support member.

8. A device for printing characters in a desired serial order comprising a support member, a record bearing medium, a coupling member swingably coupled to said support member, a wire matrix print head swingably coupled to said coupling member, an inked ribbon interposed between said wire matrix print head and said record bearing medium to facilitate the printing of a character, a constant speed linear drive coupled to advance said support member along a substantially straight path across said record bearing medium, drive coupled to drive said wire matrix print head back and forth in the direction of travel of said support member to periodically retard displacement of said wire matrix print head relative to said record bearing medium, activating elements synchronized with said oscillating drive to selectively advance a group of wires in said wire matrix print head to print a character on said record bearing medium when the wire matrix print head moves backward relative to the motion of the support member, a return drive coupled to drive said support member back along said record bearing medium after printing a desired line of characters, and a clutch coupled to disengage said constant speed linear drive to allow activation of said return drive.

9. A device for printing characters in a desired serial order comprising a support member, a record bearing medium, a wire matrix print head, a coupling member swingably coupled to said support member and said print head about a first and second axis respectively, an inked ribbon interposed between said print head and said record bearing medium to facilitate the printing of a character, a constant speed linear drive coupled to displace continuously said support member along a substantially straight path across said record bearing medium, an oscillating drive coupled to drive said coupling member back and forth in the direction of travel of said support member to periodically retard displacement of said print head relative to said record bearing medium, activating elements synchronized with said oscillating drive to selectively advance a group of wires in said wire matrix print head to print a character on said record bearing medium when the wire matrix print head moves backward relative to the motion of the support member, a return drive coupled to drive said support member back along said record bearing medium after a line of desired characters has been printed, a clutch coupled to disengage said constant speed linear drive from said support member to allow activation of said return drive, and a ribbon drive means coupled to the inked ribbon and driven by said return drive, to advance the inked ribbon interposed between said first print head and said record bearing medium.

10. A device for printing characters in a desired serial order comprising a support member, a platen, a record bearing medium supported by said platen, a wire matrix print head, a coupling member swingably coupled to said support member and said wire matrix print head about a first and second axis respectively, an inked ribbon interposed between said wire matrix print head and said record bearing medium to facilitate the printing of a character, a constant speed linear drive coupled to displace continuously said support member along a substantially straight path across said record bearing medium, an oscillating drive coupled to drive said coupling member back and forth in the direction of travel of said support member about said first axis to periodically retard displacement of said wire matrix print head relative to said record bearing medium, activating elements synchronized with said oscillating drive to selectively advance a group of wires in said wire matrix print head to print a character on said record bearing medium when the print head moves backward relative to the motion of the support member, a return drive coupled to drive said support member back along said record bearing medium after a line of desired characters has been printed, a clutch coupled to disengage said constant speed linear drive from said support member to allow activation of said return drive, a ribbon drive means coupled to said inked ribbon and driven by said return drive, and stop means coupled to said clutch to tabulate the characters of successive lines.

11. A device for printing characters in a desired serial order comprising a base member, a platen rotatably coupled to said base member, a record bearing medium supported by said platen, tracks coupled to said base member, a support member coupled to traverse a path along said tracks, a wire matrix print head, a coupling member swingably coupled to said support member and said wire matrix print head about a first and second axis respectively, an inked ribbon interposed between said print head and said record bearing medium to facilitate the printing of a character, a constant speed linear drive coupled to displace continuously said support member along said tracks across said record bearing medium, an oscillating drive coupled to drive said coupling member back and forth in the direction of travel of said support member about said first axis to periodically retard displacement of said wire matrix print head relative to said record bearing medium, activating elements synchronized with said oscillating drive to selectively advance a group of wires in said wire matrix print head to print a character on said record bearing medium when the wire matrix print head moves backward relative to the motion of the support member, a return drive coupled to drive said support member back along said record bearing medium after a line of desired characters has been printed, a clutch selectively coupled to disengage said constant speed linear drive from said support member to allow the return of said support member by said return drive, a ribbon drive spool coupled to the inked ribbon and driven by said return drive, stop means coupled to said clutch to tabulate the characters of successive lines, and stepping means coupled to said platen to advance the record bearing medium to expose a new area to the wire matrix print head for each return cycle of the support member.

12. A device for printing characters in a desired serial order comprising a support member, a record bearing medium, a coupling member swingably coupled to said support member, a wire matrix print head swingably coupled to said coupling member, and inked ribbon interposed between said wire matrix print head and said record bearing medium to facilitate the printing of a character, a linear drive coupled to advance said record bearing medium along a substantially straight path past said support member, an oscillating drive coupled to drive said wire matrix print head back and forth in the direction of travel of said record bearing medium to periodically retard displacement of said moving record bearing medium relative to said wire matrix print head, activating elements synchronized with said oscillating drive to selectively advance a group of wires in said wire matrix print head to print a character on said record bearing medium when the wire matrix print head moves backward relative to the motion of the record bearing medium, a return drive coupled to drive said record bearing medium back passed said support member after a line of desired characters has been printed, and a clutch coupled to disengage said linear drive from said record bearing medium to permit operation of said return drive.

13. A device for printing characters in a desired serial order comprising a support member, a record bearing medium, a wire matrix print head positioned to print a character on said record bearing medium, a coupling member swingably coupled to said support member and said print head about a first and second axis respectively, an inked ribbon interposed between said wire matrix print head and said record bearing medium to facilitate the printing of a character, a constant speed forward drive coupled to advance said record bearing medium along a substantially straight path past said support member, an oscillating drive coupled to drive said wire matrix print head back and forth in the direction of travel of said record bearing medium to periodically retard displacement of said moving record bearing medium relative to said wire matrix print head, activating elements synchronized with said oscillating drive to selectively advance a group of wires in said wire matrix print head to print a character on said record bearing medium when the wire matrix print head moves backward relative to the motion of the record bearing medium, a return drive coupled to drive said record bearing medium back passed said support member after a line of desired characters has been printed, a clutch coupled to disengage said constant speed forward drive from said record bearing medium to permit operation of said return drive, and a ribbon drive spool driven by said forward drive to expose a new area of ribbon to the wire matrix print head for each character print position.

14. A device for printing characters in a desired serial order comprising a support member, a platen, a record bearing medium supported by said platen, a wire matrix print head positioned to print a character on said record bearing medium, a coupling member swingably coupled to said support member and said print head about a first and second axis respectively, an inked ribbon interposed between said wire matrix print head and said record bearing medium to facilitate the printing of a character, a constant speed forward drive coupled to said platen to advance said record bearing medium along a substantially straight path past said support member, an oscillating drive coupled to drive said coupling member back and forth about said first axis in the direction of travel of said record bearing medium to periodically retard displacement of said wire matrix print head relative to said record bearing medium, activating elements synchronized with said oscillating drive to selectively advance a group of wires in said wire matrix print head to print a character on said record bearing medium when the wire matrix print head moves backward relative to the motion of the record bearing medium, a return drive coupled to drive said record bearing medium back passed said support member after a line of desired characters has been printed, a clutch coupled to disengage said constant speed forward drive from said platen to permit operation of said return drive, a ribbon drive spool coupled to the inked ribbon and driven by said forward drive, stop means coupled to said clutch to tabulate the characters of successive lines.

15. A device for printing characters in a desired serial order comprising a support member, a strip record bearing medium, a coupling member swingably coupled to said support member, a wire matrix print head swingably coupled to said coupling member, an inked ribbon interposed between said wire matrix print head and said strip record bearing medium to facilitate the printing of a character, a constant speed drive coupled to advance said strip record bearing medium and said inked ribbon along a substantially straight path past said support member, an oscillating drive coupled to drive said wire matrix print head back and forth in the direction of travel of said record bearing medium to periodically retard displacement of said moving strip record bearing medium relative to said wire matrix print head, and activating elements synchronized with said oscillating drive to selectively advance a group of wires in said wire matrix print head to print a character on said moving strip record bearing medium when the wire matrix print head moves backward relative to the motion of the strip record bearing medium.

16. A device for printing characters in a desired serial order comprising a support member, a strip record bearing medium, a wire matrix print head, a coupling member swingably coupled to said support member and to said wire matrix print head about a first and second axis respectively, an inked ribbon interposed between said wire matrix print head and said strip record bearing medium to facilitate the printing of a character, a constant speed drive coupled to advance said strip record bearing medium and said inked ribbon along a substantially straight path past said support member, an oscillating drive coupled to said coupling member to drive said wire matrix print head back and forth in the direction of travel of said strip record bearing medium to periodically retard displacement of said moving strip record bearing medium relative to said wire matrix print head, activating elements synchronized with said oscillating drive to selectively advance a group of wires in said wire matrix print head to print a character on said moving strip record bearing medium when the wire matrix print head moves backwards relative to the motion of the strip record bearing medium, and separating means to separate said inked ribbon from said strip record bearing medium after the inked ribbon is used to mark a character on the strip of record bearing medium.

17. A device for printing characters in a desired serial order comprising a support member, a strip record bearing medium, a platen positioned behind said strip record bearing medium, a wire matrix print head, a coupling member swingably coupled to said support member and to said wire matrix print head about a first and second axis respectively, an inked ribbon interposed between said wire matrix print head and said strip record bearing medium to facilitate the printing of a character, a constant speed drive coupled to advance said strip record bearing medium and said inked ribbon along a substantially straight path past said support member, an oscillating drive coupled to drive said coupling member about said first axis back and forth in the direction of travel of said strip record bearing medium to periodically retard displacement of said moving strip record bearing medium relative to said wire matrix print head, and activating elements synchronized with said oscillating drive to selectively advance a group of wires in said wire matrix print head to print a character on said moving strip record bearing medium when the wire matrix print head moves backwards relative to the motion of the strip record bearing medium.

18. A device for printing characters in a desired serial order comprising a support member, a record bearing medium, a print element coupled to said support member, a linear drive coupled to advance said record bearing medium along a substantially straight path past said print element, and an oscillating drive coupled to drive said print element back and forth in the direction of travel of said record bearing medium to periodically retard displacement of said record bearing medium relative to said print element.

19. A device for printing characters in a desired serial order comprising a support member, a record bearing medium, a wire matrix print head coupled to said support member, a linear drive coupled to advance said record bearing medium along a substantially straight path past said support member, and an oscillating drive coupled to drive said print head back and forth in the direction of travel of said record bearing medium to periodically retard displacement of said record bearing medium relative to said wire matrix print head.

20. A device for printing characters in a desired serial order comprising a support member, a record bearing medium, a coupling member swingably coupled to said support member, a print element swingably coupled to said coupling member, a linear drive coupled to advance said record bearing medium along a substantially straight path past said support member, an oscillating drive coupled to drive said print element back and forth in the direction of travel of said record bearing medium to periodically retard displacement of said record bearing medium relative to said print element, and activating means coupled to selectively activate said print element to print a character on said record bearing medium when the print element moves backward relative to the motion of the record bearing medium.

21. A device for printing characters in a desired serial order comprising a support member, a record bearing medium, a coupling member swingably coupled to said support member, a print element swingably coupled to said coupling member, pressure sensitive marking medium interposed between said print element and said record bearing medium to facilitate the printing of a character, a linear drive coupled to advance said record bearing medium along a substantially straight path past said support member, an oscillating drive coupled to drive said print element back and forth in the direction of travel of said record bearing medium to periodically retard displacement of said record bearing medium relative to said print element, and activating means coupled to selectively activate said print element to print a character on said record bearing medium when the print element moves backward relative to the motion of the record bearing medium.

22. The combination of claim 21 wherein said pressure sensitive marking means comprises an inked ribbon.

References Cited in the file of this patent

UNITED STATES PATENTS

| | | |
|---|---|---|
| 950,473 | Campbell et al. | Mar. 1, 1910 |
| 2,178,749 | Fuller | Nov. 7, 1939 |
| 2,199,561 | Fuller et al. | May 7, 1940 |
| 2,328,638 | Fuller et al. | Sept. 7, 1943 |
| 2,674,652 | Johnson et al. | Apr. 6, 1954 |
| 2,681,614 | Rast | June 22, 1954 |
| 2,694,362 | Paige | Nov. 16, 1954 |
| 2,720,164 | Braun et al. | Oct. 11, 1955 |
| 2,728,289 | Johnson et al. | Dec. 27, 1955 |
| 2,773,443 | Lambert | Dec. 11, 1956 |
| 2,799,221 | Olivetti | July 16, 1957 |

UNITED STATES PATENT OFFICE

CERTIFICATE OF CORRECTION

Patent No. 2,911,085

November 3, 1959

Ward Leathers

It is hereby certified that error appears in the printed specification of the above numbered patent requiring correction and that the said Letters Patent should read as corrected below.

Column 10, line 20, for "suport" read -- support --; line 44, before "drive" insert -- an oscillating --; column 12, line 3, for "and" read -- an --.

Signed and sealed this 17th day of May 1960.

(SEAL)
Attest:

KARL H. AXLINE
Attesting Officer

ROBERT C. WATSON
Commissioner of Patents